US012659261B2

(12) United States Patent
Defilippi et al.

(10) Patent No.: US 12,659,261 B2
(45) Date of Patent: Jun. 16, 2026

(54) DETECTING SEGMENT EXPANSION CHANGES IN SEGMENT ROUTING USING DYNAMIC SHORTEST PATH FIRST

(71) Applicant: Ciena Corporation, Hanover, MD (US)

(72) Inventors: Todd Defilippi, Redwood City, CA (US); Cengiz Alaettinoglu, Sherman Oaks, CA (US)

(73) Assignee: Ciena Corporation, Hanover, MD (US)

( * ) Notice: Subject to any disclaimer, the term of this patent is extended or adjusted under 35 U.S.C. 154(b) by 49 days.

(21) Appl. No.: 18/532,088

(22) Filed: Dec. 7, 2023

(65) Prior Publication Data

US 2025/0193107 A1     Jun. 12, 2025

(51) Int. Cl.
*H04L 45/122* (2022.01)
*H04L 45/00* (2022.01)
*H04L 45/03* (2022.01)

(52) U.S. Cl.
CPC ............ *H04L 45/122* (2013.01); *H04L 45/03* (2022.05); *H04L 45/34* (2013.01)

(58) Field of Classification Search
CPC ........ H04L 45/122; H04L 45/03; H04L 45/34
USPC ......................................................... 709/238
See application file for complete search history.

(56) References Cited

U.S. PATENT DOCUMENTS

| | | | |
|---|---|---|---|
| 7,058,016 B1 * | 6/2006 | Harper ................... | H04L 45/00 |
| | | | 370/254 |
| 7,120,792 B1 | 10/2006 | Jacobson et al. | |
| 7,197,573 B1 | 3/2007 | Jacobson et al. | |
| 7,234,001 B2 * | 6/2007 | Simpson ................. | H04L 45/22 |
| | | | 709/239 |
| 7,428,213 B2 * | 9/2008 | Vasseur ................... | H04L 45/50 |
| | | | 370/242 |
| 7,539,191 B1 | 5/2009 | Jacobson et al. | |
| 7,545,756 B2 | 6/2009 | Previdi | |
| 8,135,834 B1 | 3/2012 | Jacobson et al. | |

(Continued)

FOREIGN PATENT DOCUMENTS

| | | | | |
|---|---|---|---|---|
| CN | 115567438 A | | 1/2023 | |
| CN | 118869565 A | * | 10/2024 | ......... H04L 61/5076 |
| WO | 2023038818 A1 | | 3/2023 | |

OTHER PUBLICATIONS

D. Frigioni et al., "Fully Dynamic Output Bonded Single Source Shortest Path Problem," Chapter 25, pp. 212-221.

(Continued)

*Primary Examiner* — Moustafa M Meky
*Assistant Examiner* — Kidest Mendaye
(74) *Attorney, Agent, or Firm* — Baratta Law PLLC; Lawrence A. Baratta, Jr.

(57) ABSTRACT

Systems and methods for detecting segment expansion changes in Segment Routing using Dynamic Shortest Path First (SPF) include tracking one or more provisioned paths for one or more Segment Routing (SR) policies in a Segment Routing network, based on Shortest Path First (SPF) pairs associated with segments of the one or more provisioned paths; responsive to routing changes in the Segment Routing network, determining which of the SPF pairs are affected due to their SPF trees changing based on the routing changes; and determining which of the one or more SR policies have veered off of their respective provisioned path based on which of the SPF pairs are affected by the routing changes.

20 Claims, 4 Drawing Sheets

(56)                    References Cited

U.S. PATENT DOCUMENTS

| | | | |
|---|---|---|---|
| 8,274,901 B1 | 9/2012 | Casner et al. | |
| 8,422,502 B1 | 4/2013 | Alaettinoglu et al. | |
| 8,937,946 B1 | 1/2015 | Kanna et al. | |
| 9,026,674 B1 | 5/2015 | Kanna et al. | |
| 9,537,846 B2 * | 1/2017 | Jethanandani | H04L 63/08 |
| 10,601,724 B1 * | 3/2020 | Filsfils | H04L 43/0888 |
| 11,057,278 B1 | 7/2021 | Côté et al. | |
| 11,425,056 B1 * | 8/2022 | Kumar | H04L 45/34 |
| 2013/0039651 A1 * | 2/2013 | Sadananda | H04Q 11/0062 |
| | | | 398/26 |
| 2014/0369238 A1 | 12/2014 | Alaettinoglu et al. | |
| 2015/0117203 A1 * | 4/2015 | Filsfils | H04L 47/20 |
| | | | 370/235 |
| 2016/0057049 A1 | 2/2016 | Jacobson et al. | |
| 2017/0222920 A1 * | 8/2017 | Thubert | H04L 45/70 |
| 2019/0288941 A1 * | 9/2019 | Filsfils | H04L 69/22 |
| 2020/0008067 A1 * | 1/2020 | Filsfils | H04L 47/825 |
| 2020/0389401 A1 * | 12/2020 | Enguehard | H04L 45/745 |
| 2021/0029021 A1 * | 1/2021 | Torvi | H04L 45/24 |
| 2021/0099378 A1 | 4/2021 | Alaettinoglu et al. | |
| 2022/0086078 A1 | 3/2022 | Sivabalan et al. | |
| 2022/0103463 A1 * | 3/2022 | Margaria | H04L 45/24 |
| 2022/0225171 A1 * | 7/2022 | Thubert | H04L 45/24 |
| 2023/0062080 A1 * | 3/2023 | Sidebottom | H04L 45/24 |
| 2023/0067946 A1 | 3/2023 | Alaettinoglu et al. | |
| 2023/0095297 A1 | 3/2023 | Alaettinoglu et al. | |
| 2023/0098528 A1 | 3/2023 | Alaettinoglu et al. | |
| 2023/0146226 A1 | 5/2023 | Sivabalan et al. | |
| 2024/0235984 A1 * | 7/2024 | Chunduri | H04L 45/302 |

OTHER PUBLICATIONS

C. Filsfils et al., "Segment Routing Architecture," Internet Engineering Task Force (IETF), Category: Standards Track, ISSN: 2070-1721, Jul. 2018, pp. 1-32.

C. Filsfils et al., "IPv6 Segment Routing Header (SRH)," Internet Engineering Task Force (IETF), Standards Track, ISSN: 2070-1721, Mar. 2020, pp. 1-27.

Minghao Xu et al., "P-LFA: A Novel LFA-Based Percolation Fast Rerouting Mechanism," WASA 2022, LNCS 13472, Nov. 17, 2022, pp. 557-571.

Mar. 5, 2025, International Search Report and Written Opinion for International Patent Application No. PCT/US2024/058180.

* cited by examiner

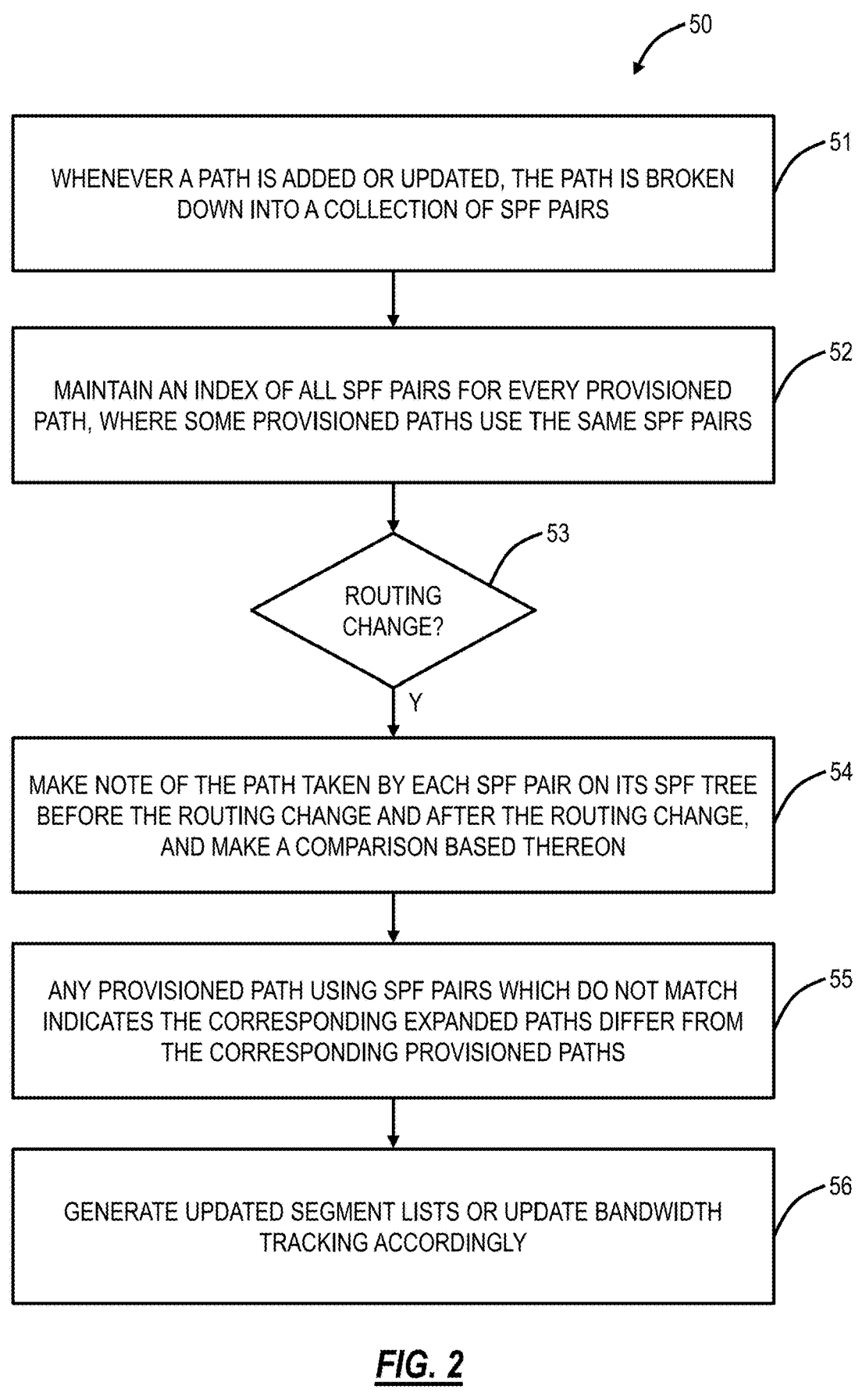

50

51

WHENEVER A PATH IS ADDED OR UPDATED, THE PATH IS BROKEN DOWN INTO A COLLECTION OF SPF PAIRS

52

MAINTAIN AN INDEX OF ALL SPF PAIRS FOR EVERY PROVISIONED PATH, WHERE SOME PROVISIONED PATHS USE THE SAME SPF PAIRS

53

ROUTING CHANGE?

Y

54

MAKE NOTE OF THE PATH TAKEN BY EACH SPF PAIR ON ITS SPF TREE BEFORE THE ROUTING CHANGE AND AFTER THE ROUTING CHANGE, AND MAKE A COMPARISON BASED THEREON

55

ANY PROVISIONED PATH USING SPF PAIRS WHICH DO NOT MATCH INDICATES THE CORRESPONDING EXPANDED PATHS DIFFER FROM THE CORRESPONDING PROVISIONED PATHS

56

GENERATE UPDATED SEGMENT LISTS OR UPDATE BANDWIDTH TRACKING ACCORDINGLY

*FIG. 2*

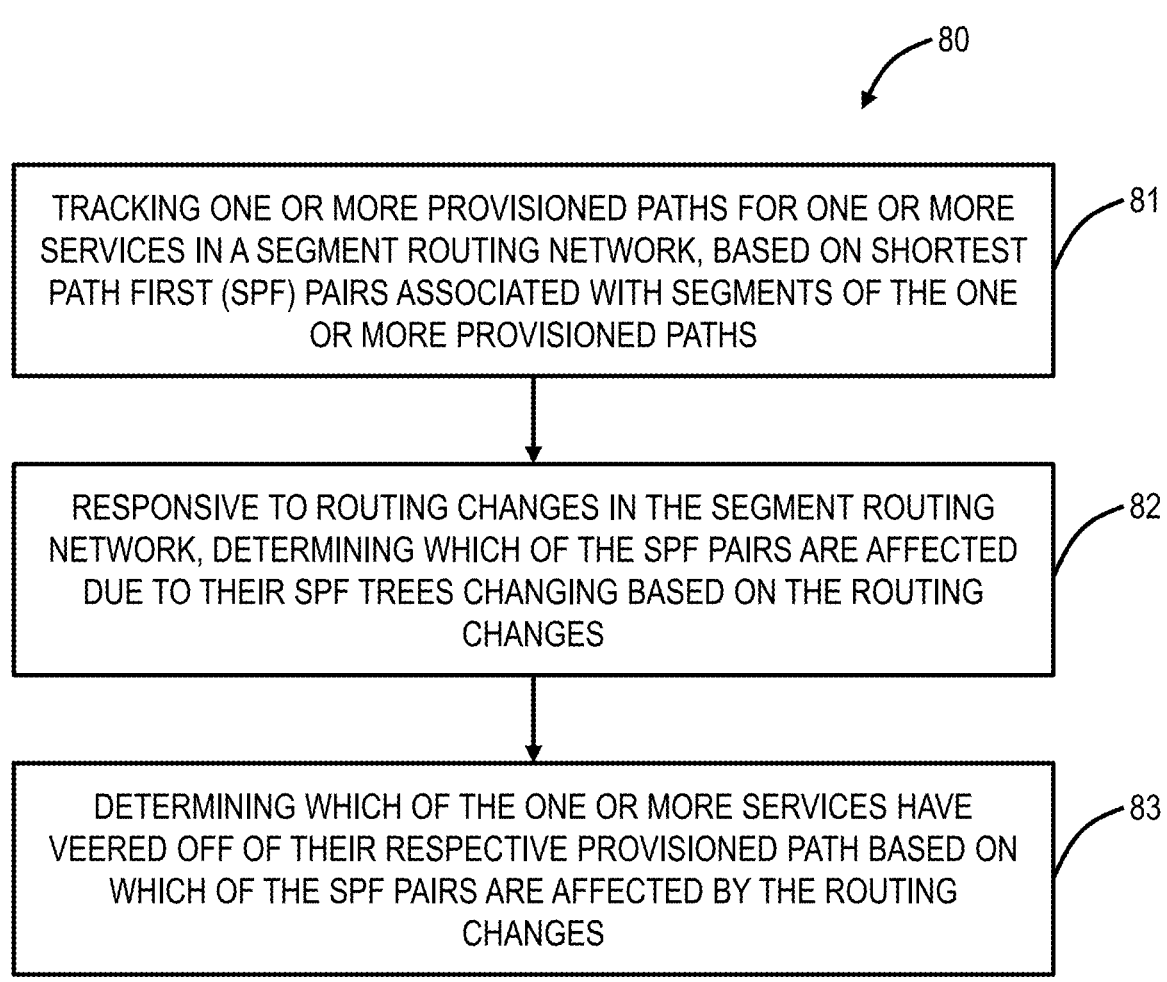

80

TRACKING ONE OR MORE PROVISIONED PATHS FOR ONE OR MORE
SERVICES IN A SEGMENT ROUTING NETWORK, BASED ON SHORTEST
PATH FIRST (SPF) PAIRS ASSOCIATED WITH SEGMENTS OF THE ONE
OR MORE PROVISIONED PATHS

81

RESPONSIVE TO ROUTING CHANGES IN THE SEGMENT ROUTING
NETWORK, DETERMINING WHICH OF THE SPF PAIRS ARE AFFECTED
DUE TO THEIR SPF TREES CHANGING BASED ON THE ROUTING
CHANGES

82

DETERMINING WHICH OF THE ONE OR MORE SERVICES HAVE
VEERED OFF OF THEIR RESPECTIVE PROVISIONED PATH BASED ON
WHICH OF THE SPF PAIRS ARE AFFECTED BY THE ROUTING
CHANGES

83

_FIG. 3_

DETECTING SEGMENT EXPANSION CHANGES IN SEGMENT ROUTING USING DYNAMIC SHORTEST PATH FIRST

FIELD OF THE DISCLOSURE

The present disclosure relates generally to networking and computing. More particularly, the present disclosure relates to systems and methods for detecting segment expansion changes in Segment Routing using Dynamic Shortest Path First (SPF).

BACKGROUND OF THE DISCLOSURE

Segment Routing (SR) is a technology that implements a source routing paradigm. A packet header includes a stack of function identifiers, known as segments, which define an ordered list of functions to be applied to the packet. A segment can represent any instruction, topological, or service-based, and each segment is represented by a Segment Identifier (SID). A segment can have a local semantic to an SR node or global within an SR domain. These functions include, but are not limited to, the forwarding behaviors to apply successively to the packet, notably destination-based unicast forwarding via a sequence of explicitly enumerated nodes (domain-unique node segments) and links (adjacency segments), and the like. Segment Routing allows forcing a flow through any topological path and service chain while maintaining a per-flow state only at the ingress node to the Segment Routing domain. Segment Routing is described, e.g., in Fiflsfils et al., RFC 8402, "Segment Routing Architecture," Internet Engineering Task Force (IETF), July 2018, the contents of which are incorporated herein by reference. In Segment Routing, a path includes segments which are instructions a node executes on an incoming packet.

BRIEF SUMMARY OF THE DISCLOSURE

The present disclosure relates to systems and methods for detecting segment expansion changes in Segment Routing (SR) using Dynamic SPF. Specifically, the present disclosure enables a Path Computation Element (PCE) or the like to monitor a Segment Routing network to determine when there are differences between provisioned paths and their corresponding expanded paths defined by a segment list. The approach described herein enables reaction to routing events as they occur, as opposed to waiting for timed intervals, for checking. Further, the present disclosure limits re-calculation to those paths which are affected by routing changes, which we know through changes to their SPF results by comparing this before and after the routing changes. As such, we are able to determine these changes to the SPF results in an efficient manner by using dynamic SPF rather than full SPF, taking amortized time $O(S*\log N)$, where S is the number of SPF calculations and N is a number of nodes. This would cut down processing time of reaction to routing events in network management systems, controllers, orchestrators, etc. It would enable more real-time reaction to the network changes.

In various embodiments, the present disclosure includes a method having steps, an apparatus configured to implement the steps, such as a network element, a processing device, a PCE, etc., and a non-transitory computer-readable medium storing instructions that, when executed, cause one or more processors, to perform the steps. The steps include tracking one or more provisioned paths for one or more Segment Routing (SR) policies in a Segment Routing network, based on Shortest Path First (SPF) pairs associated with segments of the one or more provisioned paths; responsive to routing changes in the Segment Routing network, determining which of the SPF pairs are affected due to their SPF trees changing based on the routing changes; and determining which of the one or more SR policies have veered off of their respective provisioned path based on which of the SPF pairs are affected by the routing changes.

The determining which of the SPF pairs are affected can include, for a given SPF pair, determining a first path taken by the given SPF pair on its SPF tree before the routing change; determining a second path taken by the given SPF pair on its SPF tree after the routing change; and determining the given SPF pair is affected if the second path and the first path no longer match after the routing change. The SPF tree can be updated based on the routing change using dynamic SPF algorithms which update the SPF tree based on the routing change instead of recomputing the SPF tree entirely. The SPF trees changing based on the routing changes can be updated using dynamic SPF algorithms which update the SPF tree based on the routing change instead of recomputing the SPF tree entirely.

The tracking can include an index of the SPF pairs and which segment lists of the one or more provisioned paths expanded include each of the SPF pairs, such that a plurality of provisioned paths use a same SPF pair. The determining which of the one or more SR policies have veered off of their respective provisioned path can include, for the one or more SR policies that have SPF pairs that are affected, performing a full expansion of all segments to check if an expanded path based on the full expansion matches a corresponding provisioned path. The steps can further include, for the one or more SR policies that have veered off of their respective provisioned path, determining a respective new segment list that matches their respective provisioned path after the routing changes.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a process for tracking changes according to an embodiment of the present disclosure.

FIG. 3 is a process 80 for detecting segment expansion changes in Segment Routing using dynamic SPF according to an embodiment of the present disclosure.

DETAILED DESCRIPTION OF THE DISCLOSURE

Figure 1:
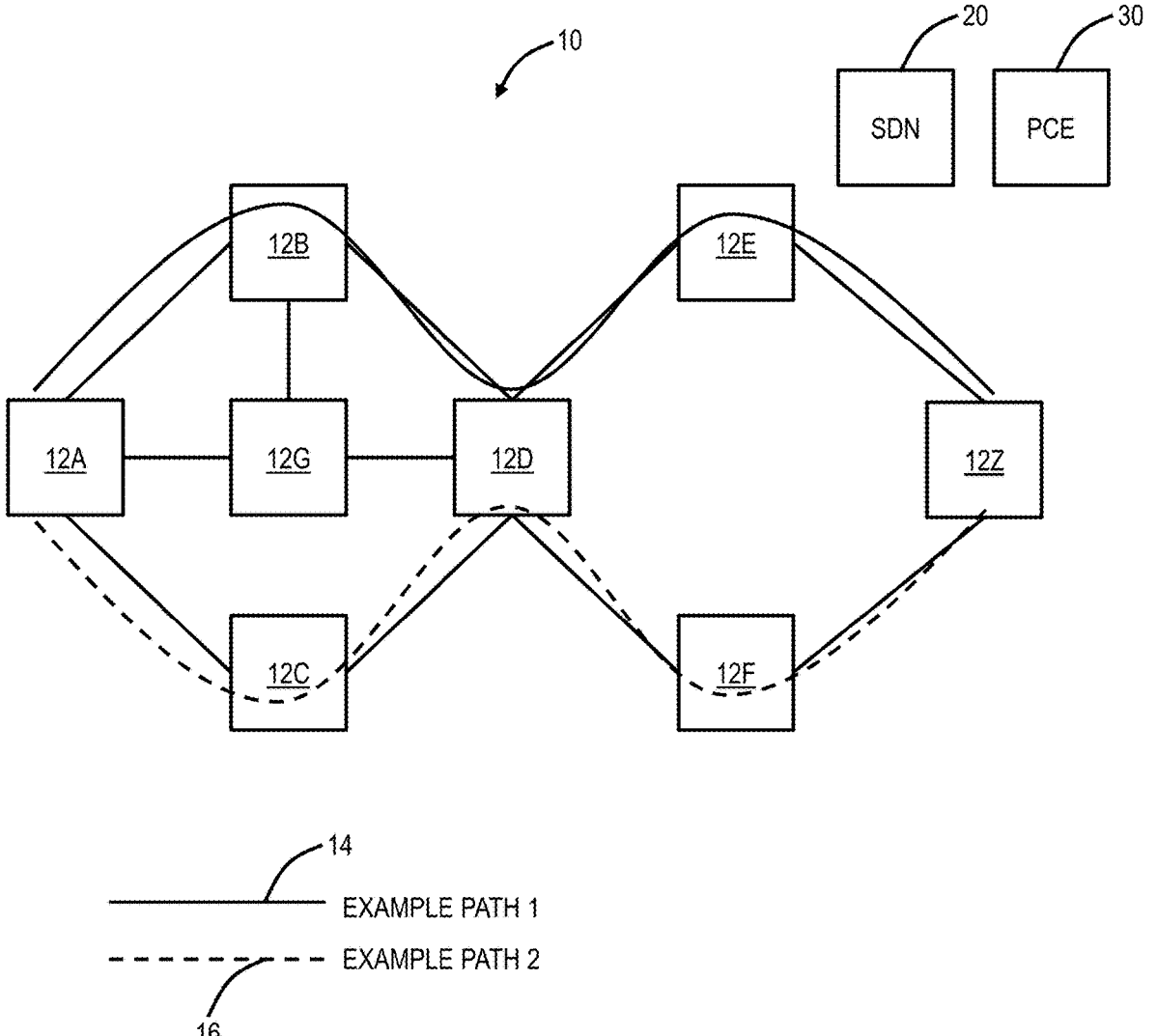
FIG. 1 is a network diagram of a network including network elements illustrating two example paths.

Again, the present disclosure relates to systems and methods for detecting segment expansion changes in Segment Routing (SR) using Dynamic SPF.

Segment Routing Overview

A particular attraction of Segment Routing is that it obviates the need to install and maintain any end-to-end (e2e) path state in the core network. Only the ingress node for a particular flow needs to hold the segment stack, which is applied as the header of every packet of that flow, to define its route through the network. This makes Segment Routing particularly suited to control by the Software Defined Networking (SDN) model.

Segment Routing can be directly applied to Multiprotocol Label Switching (MPLS) with no change in the forwarding plane. A segment is encoded as an MPLS label. An ordered list of segments is encoded as a stack of labels. The segment to process is on the top of the stack. Upon completion of a segment, the related label is popped from the stack. Segment Routing can also be applied to the Internet Protocol (IP) v6 architecture, with a new type of routing extension header—for example, RFC 8754, "IPv6 Segment Routing Header (SRH)," March 2020, the contents of both are incorporated by reference. A segment is encoded as an IPv6 address. An ordered list of segments is encoded as an ordered list of IPv6 addresses in the routing extension header. The Segment to process at any point along the path through the network is indicated by a pointer in the routing extension header. Upon completion of a segment, the pointer is incremented. Segment Routing can also be applied to Ethernet, e.g., IEEE 802.1 and variants thereof. There are various benefits asserted for Segment Routing, including, for example, scalable end-to-end policy, easy incorporation in IP and SDN architectures, operational simplicity, a balance between distributed intelligence, centralized optimization, and application-based policy creation, and the like.

In loose source routing such as Segment Routing, a source node chooses a path or is provided a path by an SDN controller or PCE, and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and straightforward to deploy. Segment Routing natively supports both IPv6 (SRv6) and MPLS (SR-MPLS) forwarding planes and can co-exist with other transport technologies, e.g., Resource Reservation Protocol (RSVP)-Traffic Engineering (RSVP-TE) and Label Distribution Protocol (LDP).

In Segment Routing, a path includes segments which are instructions a node executes on an incoming packet. For example, segments can include forwarding the packet according to the shortest path to the destination, forwarding through a specific interface, or delivering the packet to a given application/service instance. Each Segment can be represented by a Segment Identifier (SID). Note, we may use the terms segment and SID interchangeably herein, and those skilled in the art will appreciate a segment is the actual pair of nodes and associated interfaces in the network whereas the SID is an identification thereof. SIDs are allocated from a Segment Routing Global Block (SRGB) with domain-wide scope and significance, or from a Segment Routing Local Block (SRLB) with local scope. The SRGB includes the set of global segments in the Segment Routing domain. If a node participates in multiple SR domains, there is one SRGB for each SR domain. In SRv6, the SRGB is the set of global SRv6 SIDs in the Segment Routing domain.

A segment routed path is encoded into the packet by building a SID stack or list that is added to the packet. These SIDs are popped by processing nodes, and the next SID is used to decide forwarding decisions. A SID can be one of the following types: an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by Open Shortest Path First (OSPF) or Intermediate System-Intermediate System (ISIS). The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by a label called an adjacency SID, which represents a specific adjacency, such as egress interface, to a neighboring router. The adjacency SID is distributed by ISIS or OSPF. The adjacency segment steers the traffic to a specific adjacency.

A binding segment represents a Segment Routing policy. A head-end node of the Segment Routing policy binds a Binding SID (BSID) to its policy. When the head-end node receives a packet with an active segment matching the BSID of a local Segment Routing Policy, the head-end node steers the packet into the associated Segment Routing Policy. The BSID provides greater scalability, network opacity, and service independence. Instantiation of the Segment Routing Policy may involve a list of SIDs. Any packets received with an active segment equal to BSID are steered onto the bound Segment Routing Policy. The use of a BSID allows the instantiation of the policy (the SID list) to be stored only on the node or nodes that need to impose the policy. The direction of traffic to a node supporting the policy then only requires the imposition of the BSID. If the policy changes, this also means that only the nodes imposing the policy need to be updated. Users of the policy are not impacted. The BSID can be allocated from the local or global domain. It is of special significance at the head-end node where the policy is programmed in forwarding.

An anycast segment is a type of prefix segment that represents an anycast group. An anycast segment/SID is used for policies or protection. When forwarding traffic to an anycast SID, a node processing the forwarding will pick a device from the anycast group, which is the closest. If the closest device from the anycast group goes away, traffic will automatically switch to the next closest device in the anycast group. An anycast SID also enables load balancing and Equal Cost Multipath (ECMP).

Segment Routing Traffic Engineering (SR-TE) provides a mechanism that allows a flow to be restricted to a specific topological path, while maintaining per-flow state only at the ingress node(s) to the SR-TE path. SR-TE uses a "policy" to steer traffic through the network. An SR-TE policy path is expressed as a list of segments that specifies the path, called a segment ID (SID) list. SR-TE can use the Constrained Shortest Path First (CSPF) algorithm to compute paths subject to one or more constraint(s) (e.g., link affinity) and an optimization criterion (e.g., link latency). An SR-TE path can be computed by a head-end of the path whenever possible (e.g., when paths are confined to single IGP area/level) or at a Path Computation Element (PCE) (e.g., when paths span across multiple IGP areas/levels).

Example Network

FIG. 1 is a network diagram of a network 10 including network elements 12A, 12B, 12C, 12D, 12E, 12F, 12G, 12Z illustrating two example paths 14, 16. As described herein, the network elements 12 can be nodes, switches, routers, etc. implementing Segment Routing. Assume, for illustration purposes, there is a desire to provide a path between the network elements 12A, 12Z, and assume there is a specific path computation, such as for Traffic Engineering purposes, from the network elements 12A, 12B, 12D, 12E, 12Z. This specific path computation can be performed by an SDN controller 20, a PCE 30, or the like. There is a desire that any segment list match the specific path computation, namely the network elements 12A, 12B, 12D, 12E, 12Z, which is the same as the path 14. In some embodiments, the SDN controller 20 can host the PCE 30 and track available bandwidth and other TE link characteristics on a model of the network topology it maintains.

PCE

Figure 4:
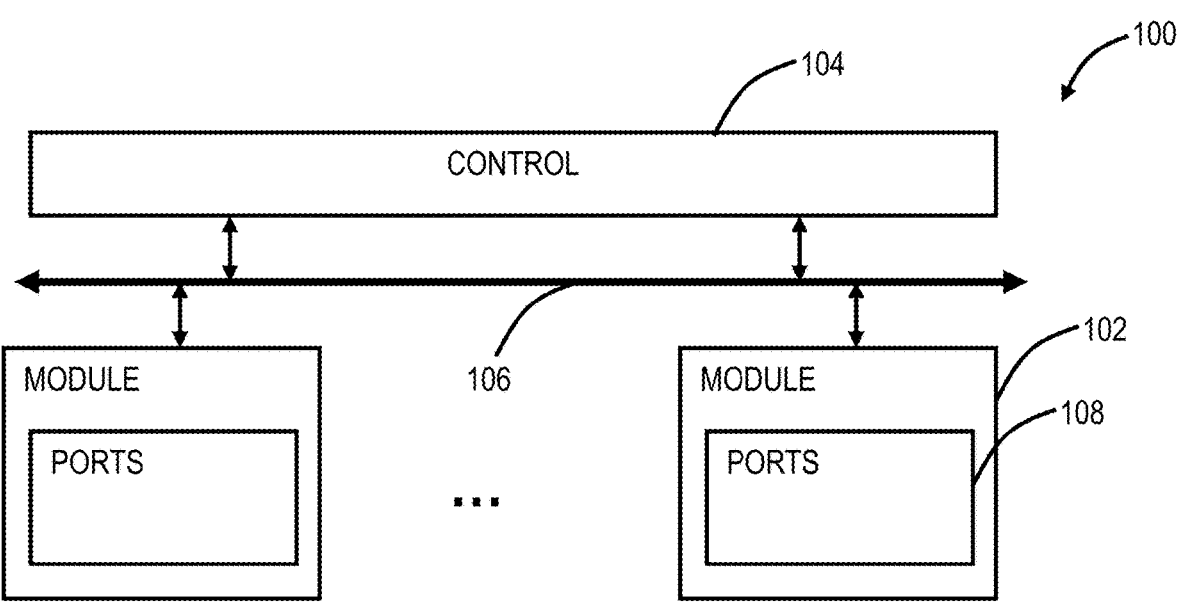
FIG. 4 is a block diagram of an example implementation of a router.

The PCE 30 is a processing device that handles traffic engineering in Segment Routing. The official definition of a PCE is an entity (component, application, or network node) that is capable of computing a network path or route based on a network graph and applying computational constraints. The PCE 20 is responsible for doing the path computation and then sending appropriate segment list (i.e., a label-stack of SID labels) to the headend node. Then the headend node pushes those segments list labels on the packets. An example embodiment of a PCE is illustrated in FIG. 4. Note, the PCE 30 can be a server, an application, a management system, a controller, etc. The present disclosure provides a segment compaction process that can be used by the PCE 30 or some other device to assign segments to an already computed path.

The PCE 30 or the like is configured to manage a set of SR policies and Traffic Engineering (TE) tunnels in the network, as well as calculate and provision which paths they take through the network. These paths typically include a list of network elements we want the path to traverse over its course; the most common elements it might traverse are interface pairs between devices, but we might also traverse other underlying policies and tunnels in the network. For SR policies in particular, when it comes time to provision the path it should take, we need to provision a segment list (Segment Identifiers (SIDs)) rather than a list of element hops, as SR policies are forwarded using segments rather than explicit interface lists.

When it comes time to provision such an SR policy path, we take our calculated path and turn it into a list of segments. There are a number of different heuristics we can use to calculate the best possible segment list; we might strive for the shortest possible segment list, or we might strive for a segment list that is resilient to future failures or repairs in the network. Regardless of which heuristic used and any is contemplated herewith, once the segment list is generated, the path we traverse by following that segment list ("expanded path") must match the SR policy path we are generating it for ("provisioned path"). Note this match is done specifically based on the network routing state at the time we generate the segment list. We want these to match at all times, not just at the generation time. Of course, they trivially match at the generation time.

Because the match or conversion of provisioned path to segment list is done at a point in time and based on the network routing state at the time, the expanded path and provisioned path might differ as routing changes in the network. When we follow segments, we attempt to reach each segment's advertiser using normal Interior Gateway Protocol (IGP) routing. Changes in links in the network, with the links going up or down, or with the links changing metrics, can affect what the IGP routing, thus affecting the path we traverse when following each segment in the segment list. When the PCE 30 calculated the provisioned path for the SR policy, it did so with specific constraints in the SR policy and the network resources available for use, and it did so in a way that assured no network resources would get overloaded and thus degrade the services over that interface. It is in the PCE's interest, then, to make sure that the expanded path continues to stay on the provisioned path, so that the PCE's assumptions about which network resources are in use by whom stay correct and no network resource gets unknowingly over-utilized.

Monitoring Approaches

That is, for proper operation, the PCE 30 needs to ensure Segment Routing (SR) policies are on their respective provisioned paths. Again, when an SR policy is initially provisioned, the path is computed at that time, and the segment list is assigned to the provisioned path at that time, such that one can assume the SR policy is on its provisioned path. However, as time goes on, this is not the case. The PCE 30 needs to be able to track for TE purposes to ensure bandwidth is properly accounted for, to ensure new SR policy provisioning is supported, i.e., to put SR policies on links that have bandwidth, and the like.

Some monitoring approaches for the PCE 30 can include:
(1) Re-calculate path segment lists at timed intervals.
(2) Re-calculate segment lists for all paths upon routing changes to the network.
(3) Run full SPF calculations before and after processing routing changes to determine which SPF results have changed.

With all of these approaches, the output for the PCE 30 can determine if various SR policies are on their respective provisioned paths or not. In cases where an SR policy is not on its provisioned path, the PCE 30 can cause a new segment list to match the provisioned path, as well as update its database to note the current path. That is, there are various remedies that the PCE 30 can implement, all of which are contemplated. The aspect here is how does the PCE 30 know for tracking purposes whether or not an SR policy is on their provisioned paths given time and routing changes that affect segment lists.

All of the above monitoring approaches have shortcomings, which are addressed herein.

(1) Re-calculate path segment lists at timed intervals. Waiting for intervals in which to re-calculate segments lists means we are not reacting quickly to routing changes. There can be long stretches of time after a routing change but before a re-calculation where the expanded segment list does not match the provisioned path, risking over-utilization of network resources.

(2) Re-calculate segment lists for all paths upon routing changes to the network. Re-calculating segment lists for all paths means we are doing segment computation for many paths which might not have been affected by the routing changes. It would be more optimal to zero in on paths who we know are affected. That is, this is a computational intense solution and is not quick.

(3) Run full SPF calculations before and after processing routing changes to determine which SPF results have changed. Running full SPF calculations before and after processing routing changes, while allowing us to identify affected paths, will take O(S*E*log N) where S is the number of unique SPF roots (i.e., headend nodes), E is the number of edges (i.e., links in the network 10), and N is the number of network elements or nodes in the network 10.

Real networks with large number of links will find this process slow and inefficient, especially if it needs to be done per routing change.

Advantageously, option (3) has the benefit of identifying specifically affected paths by any routing change, with the disadvantage of being computationally intense and slow (although faster than option (2) which would address every SR policy in the entire network).

Routing Changes

The following definitions are used herein:

Provisioned path refers to a computed path for an SR policy which represents the desired path the SR policy should be on, i.e., the PCE 30 is configured to believe the SR policy is on the provisioned path for purposes of bandwidth tracking. So, it is important for the PCE 30 to know when SR policies are off the provisioned path, for purposes of bandwidth tracking, new provisioning, etc.

Expanded path refers to a path defined by a segment list, i.e., SID list. The objective is for the expanded path to equal the provisioned path and this should usually be the case as the provisioned path is assigned the segment list that expands to the expanded path, assuming the network routing state is the same as when provisioned.

The question then becomes, how do we track if these routing changes will affect the expanded path, which might result in it no longer matching the provisioned path? Specifically, routing changes can include links going down, links coming up, new nodes or failed nodes (which are really just links coming up or going down), and links changing metrics.

For links going down, this is trivial. Only a link on the provisioned path going down could cause the expanded path to divert from the provisioned path, as the link in question would no longer be usable and the expanded path would need to route around the failure. Since we already know the provisioned path, it is simple to track the links in the provisioned path and watch for any of them going down. A link not on the provisioned path going down should not affect the expanded path in anyway, so we can easily ignore it. That is, here, the PCE 30 can simply track provisioned paths and links and know any provisioned path with a failed link will no longer match the expanded path. The PCE 30 can simply update its database, removing the failed link and determining bandwidth usage on other links by assuming all provisioned paths that include the failed link will reroute to different links.

Links changing metric and links coming up are more difficult. Increases in the metrics of links on the provisioned path or decreases in the metrics of links off of the provisioned path, may change the path that IGP routing follows for a given segment, taking the expanded path off of the course of the provisioned path. Links coming up off of the provisioned path may also offer a better (shorter) path for following a particular segment, also taking the expanded path off of the provisioned path. In all of these cases, we do not automatically know if that link event will change the expanded path in the same way we know it definitely will or will not happen for links going down. We need to make use of our knowledge of IGP routing to make such a determination.

SPF

As described herein, SPF refers to a path computation algorithm, such as Dijkstra's algorithm and the like where there is a single node as the source or headend node and the algorithm finds shortest paths from the source (SPF source roots) to all other nodes in the graph, producing a shortest-path tree (which we refer to as well as an SPF tree). So, from a network perspective, there are S sources, N total nodes, and E edges (links), and there are S SPF trees. As described herein, recomputing all S SPF trees takes on the order of $O(S*E*\log N)$.

The present disclosure looks at the S SPF trees and evaluates routing changes. To do this, we have to break down the segment list into individual segments, and look at how each segment can be affected by changes to IGP routing. We have to look at how each segment type is forwarded; in each case, we look at how we get from the current node to wherever the segment wants us to go, which is as follows:

(1) Node segments: Forwarding from the current node to the node advertising the segment depends on IGP routing. We need to perform an SPF calculation at the current node and follow this SPF tree to the advertising node.

(2) Prefix segments: Forwarding from the current node to the closest advertising node(s) for the segment depends on IGP routing. We need to perform an SPF calculation at the current node and follow this SPF tree to the advertising node(s).

(3) Adjacency segments: This depends on which the adjacency segment is global or local, and if the current node is also the advertising node. If it is global and they are not the same node, we first need to get to the advertising node, and forwarding from the current node to the advertising node depends on IGP routing; we need to perform an SPF calculation at the current node and follow this SPF tree to the advertising node. Once at the advertising node, we forward over the advertising interface to the next node, and that is beyond the control of IGP routing.

(4) Binding segments: We forward over the bound SR policy or TE tunnel using the binding SID in the binding segment; we follow the existing routing for that particular SR policy or TE tunnel; this is beyond the control of IGP routing. If the bound path happens to be an SR policy, the steps here also apply to it independently, but its routing decisions will not be a part of this policy's routing.

So, we see there are pieces with the forwarding of node, prefix, and adjacency segments where we need to determine the SPF trees rooted at certain nodes and then follow them to other nodes. We will make note of these SPF (source, destination) pairs. That is, as described herein, an SPF pair means the current node and the advertising node, based on the node, prefix, and adjacency segments described above. The current node is at the start of the segment and the advertising node is where the node, prefix, or adjacency segment wants to go. These SPF pairs are ultimately what will determine our IGP routing for those segments, and so determining changes in our IGP routing means determining changes to the respective paths associated with those SPF pairs, i.e., to the SPF tree specifically looking at the branch for the SPF pair.

Tracking Changes

FIG. 2 is a process 50 for tracking changes according to an embodiment of the present disclosure. The process 50 can be realized as a method having steps; via an apparatus such as a processing system, such as the PCE 30, disposed in, associated with, or connected to a router, with the processing system including at least one processor configured to implement the steps; and as a non-transitory computer-readable medium storing instructions that, when executed by at least one processor, cause the at least one processor to implement the steps.

For each provisioned path we are managing in the PCE 30, whenever such a path is added to or updated within the PCE 30, we need to break it down into a collection of SPF (source, destination) pairs (step 51). This can be performed following the methodology listed above. Namely, a provisioned path is converted to a segment list, which will expand to an expanded path that matches the provisioned path initially (since the conversion is performed with the current network routing state). Then, the segment list is converted to individual segments, i.e., defined by each SID in the segment list. Next, the SPF pairs are determined for each SID in the segment list based on whether each of the SIDs is a node, prefix, or adjacency SID, as described above.

We then index all of the SPF (source, destination) pairs for every provisioned path into one PCE-wide collection (i.e., database, list, or any data structure stored in memory or a data store), noting for each such pair which provisioned paths are using it (step 52). It is likely multiple provisioned paths might use the same SPF (source, destination) pair. That is, there can be a many-to-many correlation between SR policies (provisioned paths) and SPF pairs. This provides some efficiency in that we will not need to recompute every SPF tree for every SR policy but can look at SPF pairs affected by the routing changes only.

We can then make use of this SPF pair index whenever routing changes occur (step 53). Before we process routing changes, we make note of the path taken by each SPF (source, destination) pair on its SPF tree. After we process the routing changes, we make another note of the path taken by each SPF (source, destination) pair on its SPF tree. We then compare the before and after SPF paths for each SPF pair (step 54); if the SPF path has changed for an SPF pair, that means the IGP routing has changed for all provisioned paths using this particular SPF pair (step 55).

We can then do a full expansion of the segment list for each affected provisioned path, to get its new expanded path, and check if that expanded path does in fact differ from the provisioned path. If it does, we may need to generate a new provisioned segment list, based on the current routing state, since the old, provisioned segment list now no longer serves its correct purpose. Alternatively, we can update bandwidth tracking as well if we do not want to change the expanded path (step 56).

Optimization Using Dynamic SPF

While this works, it is possible to make this more efficient using so-called dynamic SPF. Among all of the SPF pairs we have indexed in the PCE 30, let's assume there are S unique SPF roots. This means before we process the routing events, we need to do S SPF calculations; and we also need to do S SPF calculations afterwards. With each SPF calculation taking O (E*log N), for E edges and N nodes in the network, this means we will need O(S*E*log N) to perform the necessary SPF calculations both before and after the routing changes are processed. If a substantial number of nodes in the network are SPF roots, we may start to approach O (N*E*log N). This is all before we even do any full expansions of the provisioned segment lists to get their new fully expanded paths, and also before we generate new provisioned segment lists.

We would like to avoid doing the full set of SPF calculations both before and after the routing changes are processed. To do this, we can make use of dynamic SPF algorithms, or simply dynamic SPF. For example, the present disclosure can utilize the dynamic SPF algorithm described by Frigioniyz, Daniele, Alberto Marchetti-Spaccamelaz, and Umberto Nanniz. "Fully dynamic output bounded single source shortest path problem." (1996), available online at dl.acm.org/doi/pdf/10.5555/313852.313926, and the contents of which are incorporated by reference in their entirety.

The goal of dynamic SPF algorithms is to update SPF trees without performing a full SPF tree calculation. This dynamic SPF runs after SPF trees have already been calculated, and updates the SPF trees based on the routing changes, rather than requiring new SPF tree calculations from scratch. It inspects each routing event relative to the existing SPF trees, and attempts to limit which nodes in the existing SPF trees need to be looked at and updated; it does this based on how the nodes and links updated by the routing event touch specific sections of the existing SPF trees. Most of the routing events can easily be determined to not affect the SPF trees for most SPF (source, destination) pairs at all; for others, it might be possible to zero in on which section of the tree they affect, while the rest can be left untouched; these cases allow us to save significant time.

Each update based on a single routing event takes O (log N) amortized time, meaning S unique SPF roots, it will take O(S*log N) time. We have essentially replaced factors based on the total number of links and total number of SPF trees in the network with a factor based on the total number of the SPF trees, cutting out the entire factor of the total number of links in the network.

Process for Detecting Segment Expansion Changes in Segment Routing Using Dynamic SPF FIG. 3 is a process 80 for detecting segment expansion changes in Segment Routing using dynamic SPF according to an embodiment of the present disclosure. The process 80 can be realized as a method having steps; via an apparatus such as a processing system, such as the PCE 30, disposed in, associated with, or connected to a router, with the processing system including at least one processor configured to implement the steps; and as a non-transitory computer-readable medium storing instructions that, when executed by at least one processor, cause the at least one processor to implement the steps.

The process 80 includes tracking one or more provisioned paths for one or more Segment Routing (SR) policies in a Segment Routing network, based on Shortest Path First (SPF) pairs associated with segments of the one or more provisioned paths (step 81); responsive to routing changes in the Segment Routing network, determining which of the SPF pairs are affected due to their SPF trees changing based on the routing changes (step 82); and determining which of the one or more SR policies have veered off of their respective provisioned path based on which of the SPF pairs are affected by the routing changes (step 83).

Again, SPF pairs are a current node and an advertising node. The current node is the beginning of the segment and the advertising node is at the end of the segment. The SPF pair can be based on the type of segment, e.g., node, adjacency, or prefix. That is, the process 80 tracks provisioned paths based on SPF pairs and these SPF pairs are used when there is a routing change to determine if the segment expansion no longer matches a corresponding provisioned path.

The determining which of the SPF pairs are affected includes, for a given SPF pair, can include determining a first path taken by the given SPF pair on its SPF tree before the routing change; determining a second path taken by the given SPF pair on its SPF tree after the routing change; and determining the given SPF pair are affected if the second path and the first path no longer match after the routing change. The SPF tree can be updated based on the routing change using dynamic SPF algorithms which update the SPF tree based on the routing change instead of recomputing the SPF tree entirely. Also, the SPF trees changing based on the routing changes can be updated using dynamic SPF algorithms which update the SPF tree based on the routing change instead of recomputing the SPF tree entirely.

The tracking can include an index of the SPF pairs and which segment lists of the one or more provisioned paths expanded include each of the SPF pairs, such that a plurality of provisioned paths use a same SPF pair. The determining which of the one or more SR policies have veered off of their respective provisioned path includes, for the one or more SR policies that have SPF pairs that are affected, performing a full expansion of all segments to check if an expanded path based on the full expansion matches a corresponding provisioned path. The process 80 can further include, for the one or more SR policies that have veered off of their respective provisioned path, determining a respective new segment list that matches their respective provisioned path after the routing changes.

Example Node

FIG. 4 is a block diagram of an example implementation of a router 100. Those of ordinary skill in the art will recognize FIG. 4 is a functional diagram in an oversimplified manner, and a practical embodiment may include additional components and suitably configured processing logic to support known or conventional operating features that are not described in detail herein.

In an embodiment, the router 100 can be any network element or other implementations that support Segment Routing networking, include any of the network elements 12 in the network 10. In this embodiment, the router 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the router 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the router 100 out by the correct port 108 to the next router 100. "Switching fabric" includes switching/routing units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the router 100. The network interface may be utilized to communicate with an element manager, a network management system, the PCE 30, etc. Additionally, the control module 104 can include a database that tracks and maintains provisioning, configuration, operational data, and the like.

Again, those of ordinary skill in the art will recognize the router 100 can include other components which are omitted for illustration purposes, and that the systems and methods described herein are contemplated for use with a plurality of different network elements with the router 100 presented as an example type of network element. For example, in another embodiment, the router 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 4 is meant to provide a functional view, and those of ordinary skill in the art will recognize actual hardware implementations may vary.

Example Processing Device

Figure 5:
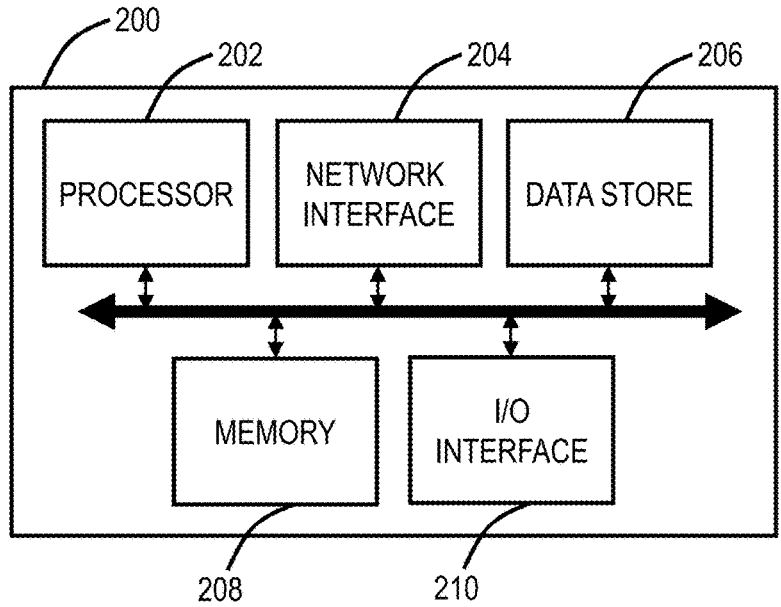
FIG. 5 is a block diagram of an example processing device.

FIG. 5 is a block diagram of an example processing device 200. The processing device 200 can be part of the router 100, or a stand-alone device communicatively coupled to the network element 100, such as the PCE 30, the SDN controller 20, etc. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, or the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof.

Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A non-transitory computer-readable medium comprising instructions that, when executed, cause one or more processors, to perform steps of:
   tracking one or more provisioned paths for one or more Segment Routing (SR) policies in a Segment Routing network, based on maintaining Shortest Path First (SPF) pairs and corresponding SPF trees associated with segments of the one or more provisioned paths;
   responsive to routing changes in the Segment Routing network, detecting affected SPF pairs based on change to corresponding SPF trees for determining which of the SPF pairs are affected due to their SPF trees changing based on the routing changes, wherein detecting comprises, for each SPF pair, comparing its SPF-tree path before and after the routing change and deeming the SPF pair affected when the paths differ; and
   determining which of the one or more SR policies have veered off of their respective provisioned path based on which of the SPF pairs are affected by the routing changes.

2. The non-transitory computer-readable medium of claim 1, wherein the determining which of the SPF pairs are affected includes, for a given SPF pair,
   determining a first path taken by the given SPF pair on its SPF tree before the routing change;
   determining a second path taken by the given SPF pair on its SPF tree after the routing change; and
   determining the given SPF pair is affected if the second path and the first path no longer match after the routing change.

3. The non-transitory computer-readable medium of claim 2, wherein the SPF tree is updated based on the routing change using dynamic SPF algorithms which update the SPF tree based on the routing change instead of recomputing the SPF tree entirely.

4. The non-transitory computer-readable medium of claim 1, wherein the SPF trees changing based on the routing changes are updated using dynamic SPF algorithms which update the SPF tree based on the routing change instead of recomputing the SPF tree entirely.

5. The non-transitory computer-readable medium of claim 1, wherein the tracking includes an index of the SPF pairs and which segment lists of the one or more provisioned paths expanded include each of the SPF pairs, such that a plurality of provisioned paths use a same SPF pair.

6. The non-transitory computer-readable medium of claim 1, wherein the determining which of the one or more SR policies have veered off of their respective provisioned path includes
   for the one or more SR policies that have SPF pairs that are affected, performing a full expansion of all segments to check if an expanded path based on the full expansion matches a corresponding provisioned path.

7. The non-transitory computer-readable medium of claim 1, wherein the steps further include
   for the one or more SR policies that have veered off of their respective provisioned path, determining a respective new segment list that matches their respective provisioned path after the routing changes.

8. An apparatus comprising:
   at least one processor, and
   memory storing instructions that, when executed, cause the at least one processor to
      track one or more provisioned paths for one or more Segment Routing (SR) policies in a Segment Routing network, based on maintaining Shortest Path First (SPF) pairs and corresponding SPF trees associated with segments of the one or more provisioned paths, responsive to routing changes in the Segment Routing network, detect affected SPF pairs based on change to corresponding SPF trees to determine which of the SPF pairs are affected due to their SPF trees changing based on the routing changes, wherein the affected SPF pairs are detected by, for each SPF pair comparing its SPF-tree path before and after the routing change and deeming the SPF pair affected when the paths differ, and determine which of the one or more SR policies have veered off of their respective provisioned path based on which of the SPF pairs are affected by the routing changes.

9. The apparatus of claim 8, wherein, to determine which of the SPF pairs are changed includes, for a given SPF pair, the instructions that, when executed, further cause the at least one processor to determine a first path taken by the given SPF pair on its SPF tree before the routing change, determine a second path taken by the given SPF pair on its SPF tree after the routing change, and determine the given SPF pair is affected if the second path and the first path no longer match after the routing change.

10. The apparatus of claim 9, wherein the SPF tree is updated based on the routing change using dynamic SPF algorithms which update the SPF tree based on the routing change instead of recomputing the SPF tree entirely.

11. The apparatus of claim 8, wherein the SPF trees changing based on the routing changes are updated using dynamic SPF algorithms which update the SPF tree based on the routing change instead of recomputing the SPF tree entirely.

12. The apparatus of claim 8, wherein the provisioned paths are tracked using an index of the SPF pairs and which of segment lists the one or more provisioned paths expanded include each of the SPF pairs, such that a plurality of provisioned paths use a same SPF pair.

13. The apparatus of claim 8, wherein, to determine which of the one or more SR policies have veered off of their respective provisioned path, the instructions that, when executed, further cause the at least one processor to for the one or more SR policies that have SPF pairs that are affected, perform a full expansion of all segments to check if an expanded path based on the full expansion matches a corresponding provisioned path.

14. The apparatus of claim 8, wherein the instructions that, when executed, further cause the at least one processor to for the one or more SR policies that have veered off of their respective provisioned path, determine a respective new segment list that matches their respective provisioned path after the routing changes.

15. A method comprising steps of:

tracking one or more provisioned paths for one or more Segment Routing (SR) policies in a Segment Routing network, based on maintaining Shortest Path First (SPF) pairs and corresponding SPF trees associated with segments of the one or more provisioned paths;

responsive to routing changes in the Segment Routing network, detecting affected SPF pairs based on change to corresponding SPF trees for determining which of the SPF pairs are affected due to their SPF trees changing based on the routing changes, wherein detecting comprises, for each SPF pair, comparing its SPF-tree path before and after the routing change and deeming the SPF pair affected when the paths differ; and determining which of the one or more SR policies have veered off of their respective provisioned path based on which of the SPF pairs are affected by the routing changes.

16. The method of claim 15, wherein the determining which of the SPF pairs are affected includes, for a given SPF pair, determining a first path taken by the given SPF pair on its SPF tree before the routing change;

determining a second path taken by the given SPF pair on its SPF tree after the routing change; and determining the given SPF pair has changed if the second path and the first path no longer match after the routing change.

17. The method of claim 15, wherein the SPF trees changing based on the routing changes are updated using dynamic SPF algorithms which update the SPF tree based on the routing change instead of recomputing the SPF tree entirely.

18. The method of claim 15, wherein the tracking includes an index of the SPF pairs and which segment lists of the one or more provisioned paths expanded include each of the SPF pairs, such that a plurality of provisioned paths use a same SPF pair.

19. The method of claim 15, wherein the determining which of the one or more SR policies have veered off of their respective provisioned path includes for the one or more SR policies that have SPF pairs that are affected, performing a full expansion of all segments to check if an expanded path based on the full expansion matches a corresponding provisioned path.

20. The method of claim 15, wherein the steps further include for the one or more SR policies that have veered off of their respective provisioned path, determining a respective new segment list that matches their respective provisioned path after the routing changes.

\* \* \* \* \*